(12) United States Patent
Surampudi et al.

(10) Patent No.: US 11,605,852 B2
(45) Date of Patent: Mar. 14, 2023

(54) TECHNIQUES FOR FORMING THERMALLY RESILIENT ENERGY STORAGE DEVICES AND A BATTERY THERMAL MANAGEMENT SYSTEM IMPLEMENTING SAME

(71) Applicant: Southwest Research Institute, San Antonio, TX (US)

(72) Inventors: Bapiraju Surampudi, San Antonio, TX (US); Benjamin Furman, San Antonio, TX (US)

(73) Assignee: SOUTHWEST RESEARCH INSTITUTE, San Antonio, TX (US)

( * ) Notice: Subject to any disclaimer, the term of this patent is extended or adjusted under 35 U.S.C. 154(b) by 68 days.

(21) Appl. No.: 17/305,267

(22) Filed: Jul. 2, 2021

(65) Prior Publication Data

US 2023/0006276 A1 Jan. 5, 2023

(51) Int. Cl.

| | | |
|---|---|---|
| *H01M 10/6551* | (2014.01) | |
| *H01M 10/0525* | (2010.01) | |
| *H01M 10/058* | (2010.01) | |
| *H01M 4/04* | (2006.01) | |
| *H01M 50/209* | (2021.01) | |
| *H01M 4/62* | (2006.01) | |

(Continued)

(52) U.S. Cl.
CPC ..... *H01M 10/6551* (2015.04); *H01M 4/0447* (2013.01); *H01M 4/1395* (2013.01); *H01M 4/628* (2013.01); *H01M 10/058* (2013.01); *H01M 10/0525* (2013.01); *H01M 10/613* (2015.04); *H01M 10/635* (2015.04); *H01M 10/6554* (2015.04); *H01M 50/209* (2021.01)

(58) Field of Classification Search
CPC ......... H01M 10/6551; H01M 10/0525; H01M 10/058; H01M 10/613; H01M 10/635
USPC ......................................................... 429/120
See application file for complete search history.

(56) References Cited

U.S. PATENT DOCUMENTS

2018/0294512 A1* 10/2018 Kim ...................... H01M 4/133
2019/0393564 A1* 12/2019 Miura ................... H01M 4/583
(Continued)

FOREIGN PATENT DOCUMENTS

GB 2582044 A * 9/2020 ............... H01G 4/08

OTHER PUBLICATIONS

Woodbank Communications Ltd, "Battery Performance Characteristics—How to specify and test a battery", pp. 1-6, Chester, UK, 2020.

(Continued)

*Primary Examiner* — James M Erwin
(74) *Attorney, Agent, or Firm* — Grossman, Tucker, Perreault & Pfleger, PLLC

(57) ABSTRACT

In general, the present disclosure is directed to forming lithium ion battery (LIB) cells with structure and chemistry that achieves formation of a solid electrolyte interphase (SEI) layer that allows for operating in relatively high ambient temperature environments, e.g., up to and exceeding 60° C., while significantly reducing self-discharge amounts, e.g., relative to other LIB cells formed with SEI layers measuring about 1-2 nanometers in thickness. For example, one non-limiting embodiment of the present disclosure enables a self-discharge amount for a LIB cell of 10% or less over a four (4) week period of time when operating at an ambient temperature of 60 degrees Celsius.

22 Claims, 6 Drawing Sheets

(51) Int. Cl.
  *H01M 10/6554* (2014.01)
  *H01M 10/613* (2014.01)
  *H01M 10/635* (2014.01)
  *H01M 4/1395* (2010.01)

(56) References Cited

U.S. PATENT DOCUMENTS

2021/0075011 A1* 3/2021 Lim .................. H01M 10/0568
2021/0210802 A1* 7/2021 Cha ....................... H01M 10/48

OTHER PUBLICATIONS

Jin An et al., "The state of understanding of the lithium-ion-battery graphite solid electrolyte interphase (SEI) and its relationship to formation cycling", Carbon 105, Tennessee, pp. 52-76, 2016.

Momidi, "Understanding Solid Electrolyte Interface (SEI) to Improve Lithium Ion Battery Performance", https://circuitdigest.com/article/what-is-solid-electrolyte-interface-sei-to-improve-lithium-ion-battery-performance, pp. 1-11, 2019.

Peled, "The Electrochemical Behavior of Alkali and Alkaline Earth Metals in Nonaqueous Battery Systems—The Solid Electrolyte Interphase Model", Journal of the Electrochemical Society, vol. 126, No. 12, pp. 2047-2051, 1979.

Peled et al., "Review—SEI: Past, Present and Future", Journal of The Electrochemical Society, vol. 164, No. 7, pp. A1703-A1719, 2017.

Quesnel, "Industry Developments in Thermal Management of Electric Vehicle Batteries", Advanced Thermal Solutions, Inc. (ATS), pp. 1-11.

Wang et al., "Review on modeling of the anode solid electrolyte interphase (SEI) for lithium-ion batteries", Published in partnership with the Shanghai Institute of Ceramics of the Chinese Academy of Sciences, NPJ Computational Materials, pp. 1-26, 2018.

Wang et al., "Self-discharge of secondary lithium-ion graphite anodes", Journal of Power Sources, Elsevier, pp. 98-104, 2002.

Zollo, "Measure Self-Discharge Using OCV on Lithium-Ion Cells", Keysight Technologies Inc. pp. 1-3.

* cited by examiner

TECHNIQUES FOR FORMING THERMALLY RESILIENT ENERGY STORAGE DEVICES AND A BATTERY THERMAL MANAGEMENT SYSTEM IMPLEMENTING SAME

TECHNICAL FIELD

This specification relates generally to energy storage devices and systems, and more particularly, to a method of forming thermally-resilient energy storage devices using, for instance, lithium ion battery (LIB) technology, to maintain self-discharge and aging at or below a target amount when operating within predetermined ambient temperature(s), and a battery thermal management system implementing the same.

BACKGROUND INFORMATION

Lithium-ion battery (LIB) technology continues to play a key role in powering numerous modern-day activities such as browsing the Internet via a mobile electronic device, storing of renewable energies (e.g., solar, wind, and so on), and providing long-range electric vehicles (EVs). Commercialization of LIB technology began in the early 1990s, and in the intervening decades, the energy density of LIB-based devices continues to increase step-wise by about 160 watt-hour per kilogram (Wh/kg) each year. Today LIB technology allows for more storage of energy per kilogram than all other rechargeable battery technologies including nickel-cadmium batteries (NiCd), lead acid, and nickel metal hydride (NiMH) batteries.

The basic structure of most LIB cells includes an anode, a cathode, and electrolyte material disposed therebetween. One significant area of research and improvement in LIB technology remains at the electrode/electrolyte interface. Formation of a LIB cell includes introduction of a passivation layer on the electrodes, and in particular, at the interface between the anode and electrolyte material. The passivation layer gets formed when the alkali anode metal gets immersed in a battery electrolyte, or when a negative potential is applied to a carbon or to an inert electrode immersed in the electrolyte, with the resulting layer formed as a solid electrolyte, commonly referred to as a solid electrolyte interphase (SEI) layer.

The resulting SEI layer limits further reduction of electrolyte, and thus, electrochemically stabilizes the LIB cell. Each charge-discharge cycle of a LIB cell results in a gradual thickening of the SEI layer and irreversible capacity loss. This is due to SEI formation and growth that consumes active lithium and electrolyte materials, and ultimately reduces charge capacity, increases battery resistance, and reduces power density.

Time and temperature factor significantly in the continued growth of SEI layers, with higher temperatures generally increasing growth rates. Current approaches to forming LIB batteries include forming a relatively thin SEI layer of a few nanometers to maximize LIB cell lifespans. The SEI layer remains a significant challenge in improving LIB cell performance, and in particular, LIB cell performance in a wide-range of operating temperatures.

BRIEF DESCRIPTION OF THE DRAWINGS

These and other features advantages will be better understood by reading the following detailed description, taken together with the drawings wherein.

The drawings included herewith are for illustrating various examples of articles, methods, and apparatuses of the teaching of the present specification and are not intended to limit the scope of what is taught in any way.

DETAILED DESCRIPTION

Continued improvement of LIB cell performance depends at least in part on SEI layer chemistries and formation processes that maintain energy storage density, limit self-discharge, and allow for continuous operation in a wide-range of less-than-ideal operating temperatures.

Figure 1:
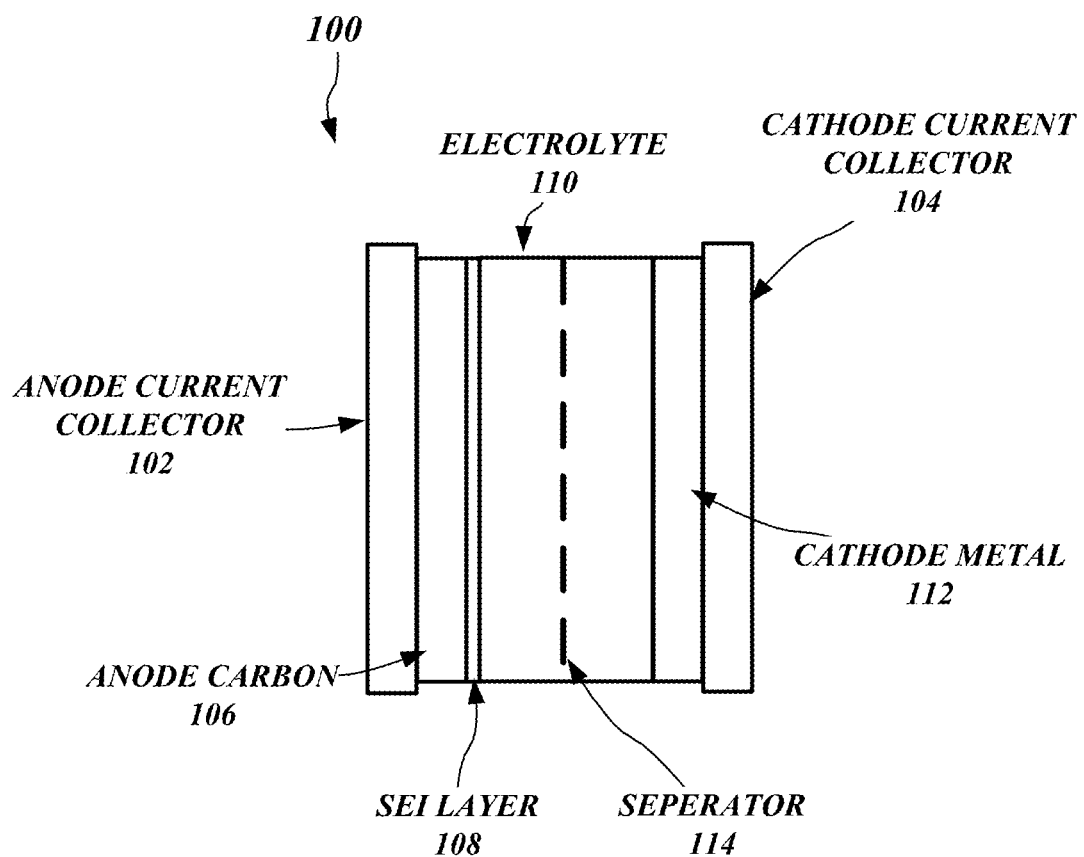
FIG. 1 shows an example LIB cell with an SEI layer formed between an anode carbon and electrolyte material.

FIG. 1 shows the basic structure of a LIB cell 100 for reference. As shown, the LIB cell 100 includes an anode current collector 102, an anode carbon 106, an SEI layer 108, electrolyte material 110, a separator 114, a cathode metal 112, and a cathode current collector 104. The components of the LIB cell 100 stack/sandwich together within a battery housing (not shown). The anode current collector 102 can comprise, for instance, copper (Cu) or other suitable material. Likewise, the cathode current collector 104 can comprise a metal such as aluminum (Al) or other suitable material. The cathode metal 112 comprises, for instance, lithium metal oxide.

Existing approaches to produce LIB cells, such as LIB cell 100, prioritize maximizing lifespan (e.g., shelf-storage life, charge-discharge cycles) by formation of an SEI layer 108 that is one or two nanometers thick (herein after referred to as "thin" SEI layers). However, this "one size fits all" approach operates on the presumption that ambient operating temperatures remain within an ideal range (e.g., 15-35 degrees Celsius (C)).

However, exposure of LIB cells having such "thin" SEI layers to ambient temperatures in excess of, for instance, 35° C., significantly impacts LIB performance characteristics such as self-discharge. The self-discharge of all battery chemistries increases at higher temperatures, and the rate typically doubles with every 10° C. (18° F.). Self-discharge refers to the amount of charge lost in a battery cell when uncoupled from load, which is to say in an open-circuit condition. Measurement of self-discharge generally includes charging a battery cell to full and performing an initial measurement of the open-circuit voltage. A subsequent measurement of the open-circuit voltage gets taken after a predetermined amount of time. The delta between the initial and subsequent measurement of open-circuit voltage indicates a lowered state of charge (SoC). Lower SoC translates to lower stored energy, i.e., stored amp-hours, and thus allows for the amount of self-discharge to be determined.

In the context of LIB cells, the amount/rate of discharge depends on multiple factors including, for instance, cell material/chemistry, SoC of the cell, temperature of the cell, and capacity of the cell. For instance, differences in potential between anode and cathode of a LIB cell caused by unwanted chemical reactions can result in so-called corrosive current. Temperature increases within a battery cell result in increased chemical reactions, and consequently, increased self-discharge amounts through such corrosive current. For example, a LIB battery cell operating at an ambient temperature of 20° C. self-discharges about 5 percent over a four (4) week period, while the same LIB battery cell operating at an ambient temperature of 60° C. self-discharges about 20% over a four (4) week period.

In recognition of these factors, battery thermal management systems (BTMS) get implemented within systems/devices that utilize LIB cells. Such BTMS systems are noted as important by the U.S. Department of Energy's National Renewable Energy Laboratory (NREL), who stipulate, among other things, that LIB cells should be kept within 15-35° C. BTMSs generally include active components such as a micro pump and heat-exchanger to maintain nominal operating temperatures. However, BTMSs can introduce significant load on battery cells. For many applications and scenarios, BTMSs introduce load that effectively reduces power density.

Thus, applications that utilize LIB technology face a paradox in that relatively high-ambient temperatures cause battery performance losses, and regulating ambient temperatures to avoid such performance loss introduces load on the battery cells that constructively lowers power density.

Thus, in general, the present disclosure is directed to forming LIB cells with structure and chemistry that allows for operating in relatively high ambient temperature environments, e.g., up to and exceeding 60° C., while significantly reducing self-discharge amounts, e.g., relative to other SEI LIB cells formed with the aforementioned "thin" SEI layers. For example, one non-limiting embodiment of the present disclosure enables a self-discharge amount for a LIB cell of 10% or less over a four (4) week period of time when operating at an ambient temperature of 60° C.

In more detail, the present disclosure has identified that corrosion current for a LIB cell is inversely proportional to the thickness of the SEI layer. Accordingly, a method of forming a LIB cell is disclosed herein that includes determining a thickness value for an SEI layer to limit self-discharge when operating at a predetermined ambient temperature. Thus, LIB cell formation includes material composition, e.g., via one or more SEI precursors, that results in formation of an SEI layer that includes a thickness substantially equal to the determined thickness.

Aspects of the present disclosure thus include forming SEI layers with a predetermined thickness that allows a battery cell to operate at a specific ambient temperature, or temperature range, and limit self-discharge when operating in that range. LIB cells formed in accordance with the present disclosure therefore include relatively thicker SEI layers than other approaches, which consequently reduces LIB cell lifespan. However, LIB cells formed consistent with the present disclosure advantageously maintain nominal power density over a longer period of time, and in a manner that is temperature resilient. Applications such as EVs may therefore eliminate or otherwise reduce BTMS loads and consequently extend overall driving range on a single charge.

In one specific example embodiment, a BTMS is disclosed herein that utilizes one or more LIB cells with a formed SEI layer that limits self-discharge at a target ambient temperature, e.g., by determining and achieving a target layer thickness for a formed SEI layer as disclosed herein. In this embodiment, the reduction in self-discharge current gets advantageously used to maintain the one or more LIB cells at the target ambient temperature. For example, a LIB cell formed consistent with the present disclosure results in a self-discharge amount of 10% or less, and preferably 4% or less, over four (4) weeks when operating at 60° C. The BTMS may be configured to preferably consume about 6% or less of stored charge over the same period. The BTMS may utilize this relatively small amount of current to reject heat in excess of the 60° C. target. Thus, the total amount of power consumed by the BTMS and self-discharge over a four (4) week period remains preferably at or under 10%. Importantly, this enables use of LIB cells in high-temperature environments, e.g., operating in ambient temperatures at or above 35° C., without the loss of energy density and battery performance degradation that would otherwise occur.

Another aspect of the present disclosure is generally directed towards utilizing boron nitride nanosheets (BNNs) to increase thermal communication between battery cells. BNNs are ideally suited for use with LIB cells, although BNNs may be utilized in a wide-range of battery types and chemistries and are not necessarily limited to LIB cells. BNNs between battery cells increase passive heat transfer and homogenize temperature distribution and transfer to a heating plate/heat exchanger. Accordingly, and in accordance with an embodiment of the present disclosure, the above-discussed BTMS system may further include one or more BBN layers disposed/coated on associated battery cells to achieve increased thermal communication and homogenous temperature distribution, thus further reducing the load of the BTMS.

The term substantially, as generally referred to herein, refers to a degree of precision within acceptable tolerance that accounts for and reflects minor real-world variation due to material composition, material defects, and/or limitations/peculiarities in manufacturing processes. Such variation may therefore be said to achieve largely, but not necessarily wholly, the target/nominal characteristic. To provide one non-limiting numerical example to quantify "substantially," such a modifier is intended to include minor variation that can cause a deviation of up to and including ±10% from a particular stated quality/characteristic unless otherwise provided by the present disclosure.

Figure 2:
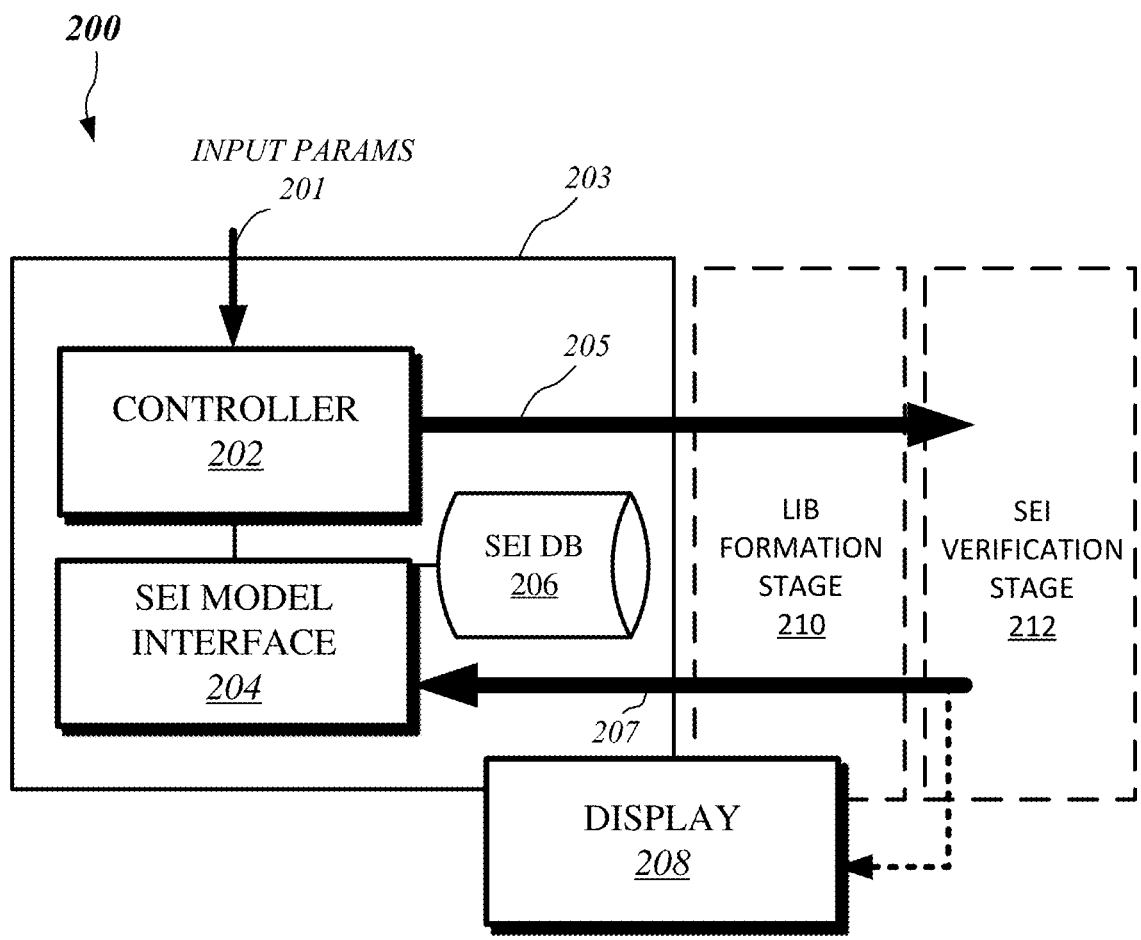
FIG. 2 shows a system for determining an SEI layer thickness for a LIB cell to achieve a target self-discharge amount when operating in a predetermined temperature/temperature range, in accordance with an embodiment of the present disclosure.

Turning to the figures, FIG. 2 shows a block diagram of an example SEI formation control system 200 in accordance with embodiments of the present disclosure. The SEI formation control system 200 includes a plurality of hardware and/or software components implemented within a single device 203, such as shown, or within multiple devices that communicate with each other via a network, communication bus, or other suitable approach.

Processes and features of the SEI formation control system 200 as discussed herein (e.g., the processes shown in FIGS. 2-5) manifest as software (e.g., machine-readable instructions compiled from C or C++ and executed on a processor/microcontroller), hardware (e.g., hardcoded gate level logic, discrete circuitry, and/or purpose-built silicon), or firmware (e.g., embedded routines executing on a microcontroller), or any combination thereof.

Preferably, the device 203 comprises a mobile computing device such as a laptop or smart phone. To this end, various processes and features disclosed herein may be implemented and controlled by a user via an "App."

Continuing on, the SEI formation control system 200 includes a controller 202, a SEI model interface 204, SEI database (DB) 206 and a display 208. The controller 202 comprises, for example, a processor (e.g., an x86 processor), microcontroller, or any other suitable device such as an application-specific integrated circuit (ASIC).

The SEI model interface 204 comprises, for instance, predefined interface definitions in the form of an application programming interface (API). The API of the SEI model interface 204 allows for input of parameters, e.g., params 201, and the initiation of various LIB formation and testing processes as discussed further below. The SEI model interface 204 further provides read/write access to the SEI DB 206 to allow for querying and updates during the aforementioned SEI formation and testing processes.

The SEI DB 206 includes one or more tables stored in a memory (not shown) that associate SEI components such as SEI precursor materials with characteristics of the same, e.g., molecular structure, crystal structure and associated properties such as electron transfer/tunneling, ion transfer, solubility, and mechanical properties, just to name a few. As generally referred to herein, SEI components refers to battery materials such as electrolytes and electrolyte additives (e.g., SEI precursors, solvents, and impurities) that chemically react to form an SEI layer.

The SEI DB can further include one or more tables that associate SEI precursors and electrolyte material combinations with resulting SEI layer properties. The values of these tables may be derived from idealized properties and/or from empirical measurements, e.g., using approaches such as electrochemical impedance spectroscopy (EIS) and cyclic voltammetry (CV). The values of these tables may further be provided or otherwise augmented by external databases such as those provided by The Materials Project (www.materialsproject.com).

Selection of SEI precursors generally includes materials having high standard electrode potential ($E^0$) and high exchange-current density ($i_0$) for reduction. However, efforts to establish databanks of materials having $i_0$ suitable for such reactions remains on-going. Alternatively, this disclosure has recognized that bimolecular rate constants ($k_e$) may be utilized as a metric for selection of SEI precursors. Well-established and available databases include 1500+ materials and associated $k_e$ values. Preferred precursors include ethyl-cyanoacrylate, $Li_2O$, $LiF$, $Li_2CO_3$, olefins and non-conducting polymers and/or semi-carbonates.

In any event, selection of SEI precursors preferably includes materials having $k_e$ higher than $10^9$ $M^{-1}$ $s^{-1}$. Alternatively, SEI precursors having a $k_e$ substantially equal to diffusion controlled reactions are also suitable for use in the processes and methods disclosed herein. One example includes Hexafluoroarsenate (AsF6-) and Carbon Dioxide (CO2), which have values of $k_e$ that approach diffusion controlled reactions.

Thus, the SEI DB 206 can provide a plurality of known SEI components and can be queried for purposes of parameterizing predictive models and/or for providing parameters into LIB formation stages to achieve specific SEI layer structure and properties, as will be discussed in greater detail below.

The display 208 comprises any suitable device for visually rendering output data from components of the SEI formation control system 200. In the context of a mobile device/smart phone, the display 208 gets implemented as a liquid crystal display (LCD) or other suitable display type.

In operation, the controller 202 receives input parameters 201 from a user, e.g., via a user interface provided by an "App." The input parameters 201 can comprise, for example, a predefined ambient temperature range for operation of a LIB cell, or simply an ambient temperature value. The input parameters 201 can further include additional parameters such as SEI component selections including electrolyte material selections, SEI precursor selections, and target self-discharge amounts.

The present disclosure has recognized corrosion current is inversely proportional to the thickness of the SEI layer. Corrosive current ($i_{corr}$) current may therefore be calculated based on the following equation:

$$i_{corr} = \frac{V_{ocp}}{\rho L} \qquad \text{Equation (1)}$$

where ($V_{ocp}$) is the open circuit potential for the LIB cell, (L) is the thickness of the SEI layer, and ($\rho$) is an electrical resistance value of the SEI layer.

Equation (1) may then be used to solve for the thickness of the SEI layer (L):

$$L = \frac{V_{ocp}}{i_{corr}\rho} \qquad \text{Equation (2)}$$

In view of the foregoing, the controller 202 utilizes the SEI model interface 204 in combination with the SEI DB 206 and Equation (2) to determine a layer thickness value for an SEI layer based on the input parameters 201, and in particular, at least the ambient temperature range/value and target self-discharge amount.

The controller 202 then outputs at least the determined layer thickness value 205 to a LIB formation stage 210, one example process of which is discussed further below with reference to FIG. 4. The LIB formation stage 210 may be implemented at least partially by the controller 202 (e.g., as machine-readable instructions, circuitry, and so on), although this disclosure is not limited in this regard.

The controller 202 may then output at least the determined layer thickness value 205 to SEI verification stage 212, one example process flow of which is discussed further below with reference to FIG. 5. The SEI verification stage 212 may be implemented at least partially by the controller 202 (e.g., as machine-readable instructions, circuitry, and so on), although this disclosure is not limited in this regard.

The SEI verification stage 212 may then output SEI verification results 207. The SEI model interface receives the outputted SEI verification results 207 and may use the same to update the SEI DB 206 to reflect the success or failure of the LIB formation process, as the case may be. This advantageously allows for a feedback loop that enables empirical verification of resulting SEI layer formation. Such verification may therefore allow for analysis of various experimental SEI component combinations and the resulting SEI layer structure and properties to be used to generate new data points for predictive SEI layer modeling.

The controller 202 may also optionally output the outputted SEI verification results 207 and/or determined layer thickness value 205 via display 208.

Example SEI Formation Architecture and Processes

The following exemplary processes of FIGS. 3-5 may be instantiated and executed by controller 202 (FIG. 2), although the processes discussed below may be performed by N number of controllers/processors and/or circuitry. Preferably, the controller 202 comprises a network of controllers (e.g., implemented in a multi-node fabric) that are configured to perform computationally-rigorous routines such as those used when modeling reduction reactions using molecular dynamics (MD) and/or density functional theory (DFT) simulations.

Note, acts of the following LIB formation & verification processes may not necessarily be performed in the order provided. Likewise the present disclosure envisions that acts may be omitted, added, or otherwise augmented to achieve a desired SEI layer thickness while remaining within the scope of this disclosure.

Figure 3:
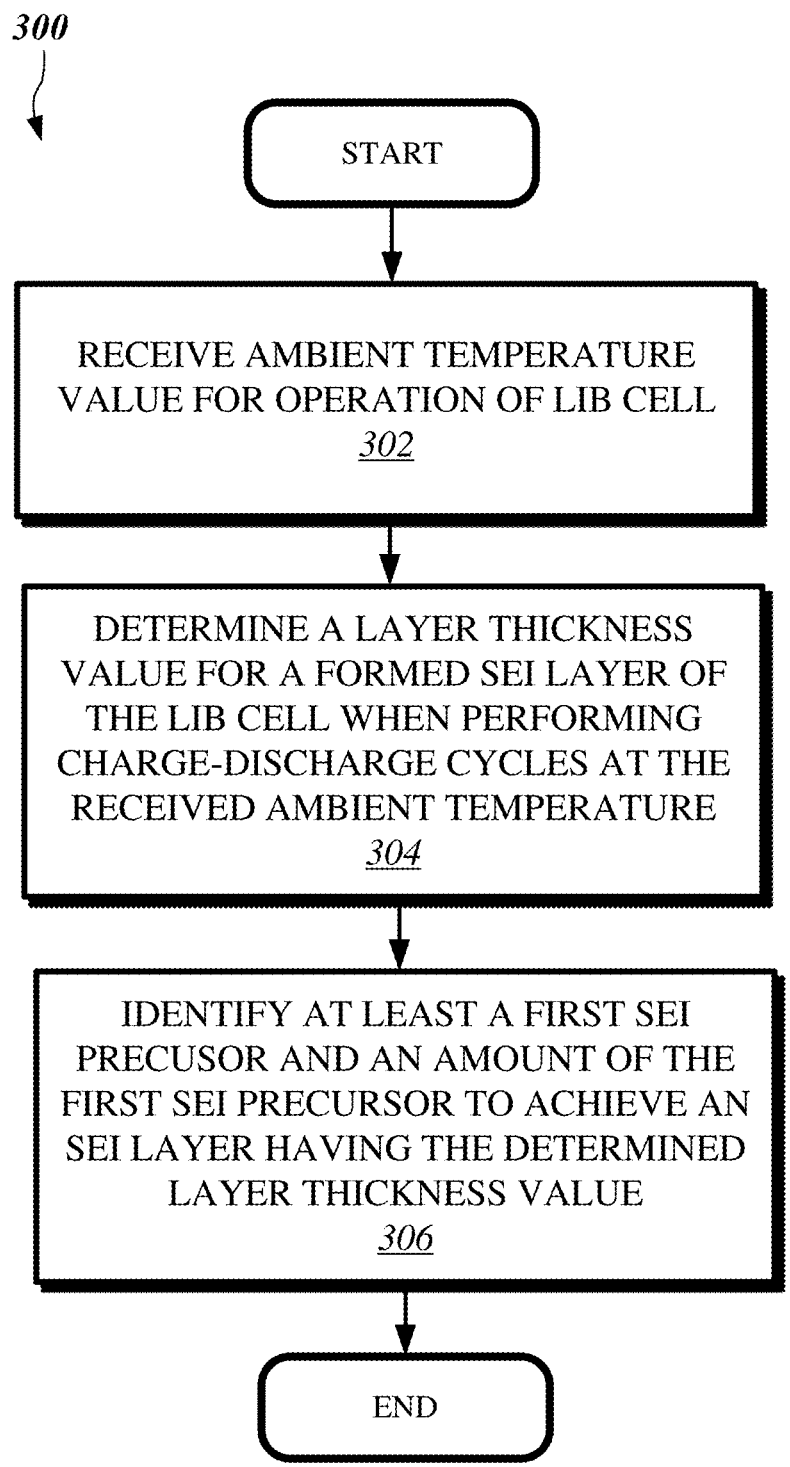
FIG. 3 shows an example process by which the system of FIG. 2 determines an SEI layer thickness value for a LIB cell, in accordance with an embodiment of the present disclosure.

FIG. 3 shows a process 300 for determining an SEI thickness value that exemplifies aspects of the foregoing discussion. The process 300 begins in act 302.

In act 302, the controller 202 receives an ambient temperature value for operation of the LIB cell. As discussed above with reference to FIG. 2, input parameters 201 include at least an identifier of a target ambient temperature or temperature range. Accordingly, the ambient temperature value includes a single identified ambient temperature or a range thereof, e.g., 35 degrees±5 degrees Celsius, 60±5 degrees Celsius. Other suitable ranges include, for instance, 35-50 degrees Celsius, 35-65 degrees Celsius, 50-65 degrees Celsius, or 55-75 degrees Celsius.

In act 304, the controller 202 determines a layer thickness value for a formed SEI layer of the LIB cell when performing charge-discharge cycles at the received ambient temperature. As discussed above, this can include the controller 202 utilizing Equations (1) and (2) in combination with SEI model database 206 and/or predefined values in memory that represent SEI layer electrical resistivity (p) and open-circuit voltage ($V_{ocp}$).

In act 306, the controller 202 optionally identifies at least a first SEI precursor and an amount of the first SEI precursor to achieve formation of an SEI layer having the layer thickness value determined in act 304. This can include the controller 202 utilizing predictive modeling and simulation using MD and/or DFT simulations in combination with the SEI database via the SEI model interface 204, for example. Alternatively, or in addition, the controller 202 determines the first SEI precursor and the amount thereof based on a table lookup in the SEI database that associates SEI components (and combinations thereof) with resulting SEI layer structure and properties (e.g., as derived from empirical measurements, predictive modeling, heuristics, or any combination thereof), which importantly includes SEI layer thickness. In this example, the controller 202 may therefore select one or more SEI precursors based on the SEI DB 206 having a priori and/or empirical knowledge that correlates SEI component(s) with formed SEI structure and properties.

For resource-constrained devices implementing controller 202, such as smart phones and laptops, the SEI database 206 preferably includes relatively sparse tables that associate a desired SEI layer thickness with one or more SEI components and SEI precursors known to achieve the same. Thus, the SEI formation control system 200 advantageously allows for, in a general sense, macro-understanding for SEI precursor selection purposes to reduce computational costs.

In act 306, the controller 202 may further cause the determined layer thickness value and/or the first identified SEI precursor (and amount thereof) to be visualized by display 208, for example. Alternatively, or in addition, the controller 202 may output the determined layer thickness and/or first identified SEI precursor to a LIB formation process, such as the LIB formation process 400 discussed below.

Figure 4:
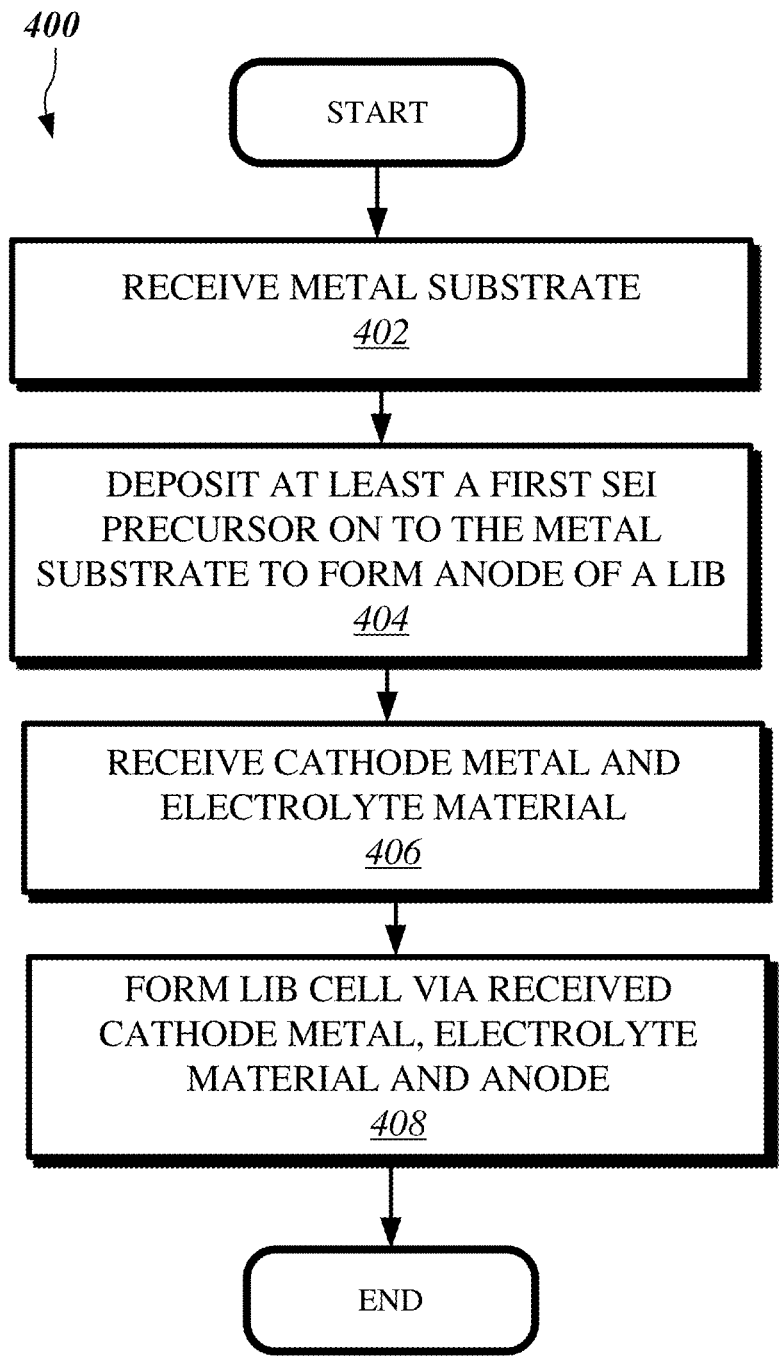
FIG. 4 shows an example process for forming a LIB cell with an SEI layer having an overall thickness substantially equal to a determined layer thickness value determined by the example process of FIG. 3.

FIG. 4 shows an example process 400 for formation of a LIB cell that exemplifies aspects of the foregoing discussion. The process 400 begins in act 402.

In act 402, the process 400 includes receiving a metal substrate. The metal substrate comprises, for example, copper with at least one layer of carbon disposed thereon.

In act 404, the process 400 includes depositing at least a first SEI precursor on to the metal substrate to form an anode of a LIB cell. The first SEI precursor may be selected based on, for instance, output from process 300 of FIG. 3. Depositing the first SEI precursor on to the metal substrate can include using so-called "thin-film" deposition via atomic layer deposition (ALD) or molecular layer deposition (MLD) techniques. Alternatively, or in addition, the first SEI precursor may be deposited in electrolyte material as an additive, and this disclosure should not be construed as limited in this regard.

In act 406, the process 400 includes receiving cathode metal and electrolyte material. In act 408, the process 400 includes forming the LIB cell with the received cathode metal, electrolyte material, and anode. Subsequent to act 406, the LIB cell can include a structure similar to that of the LIB cell shown in FIG. 1, notably without the formed SEI layer.

Figure 5:
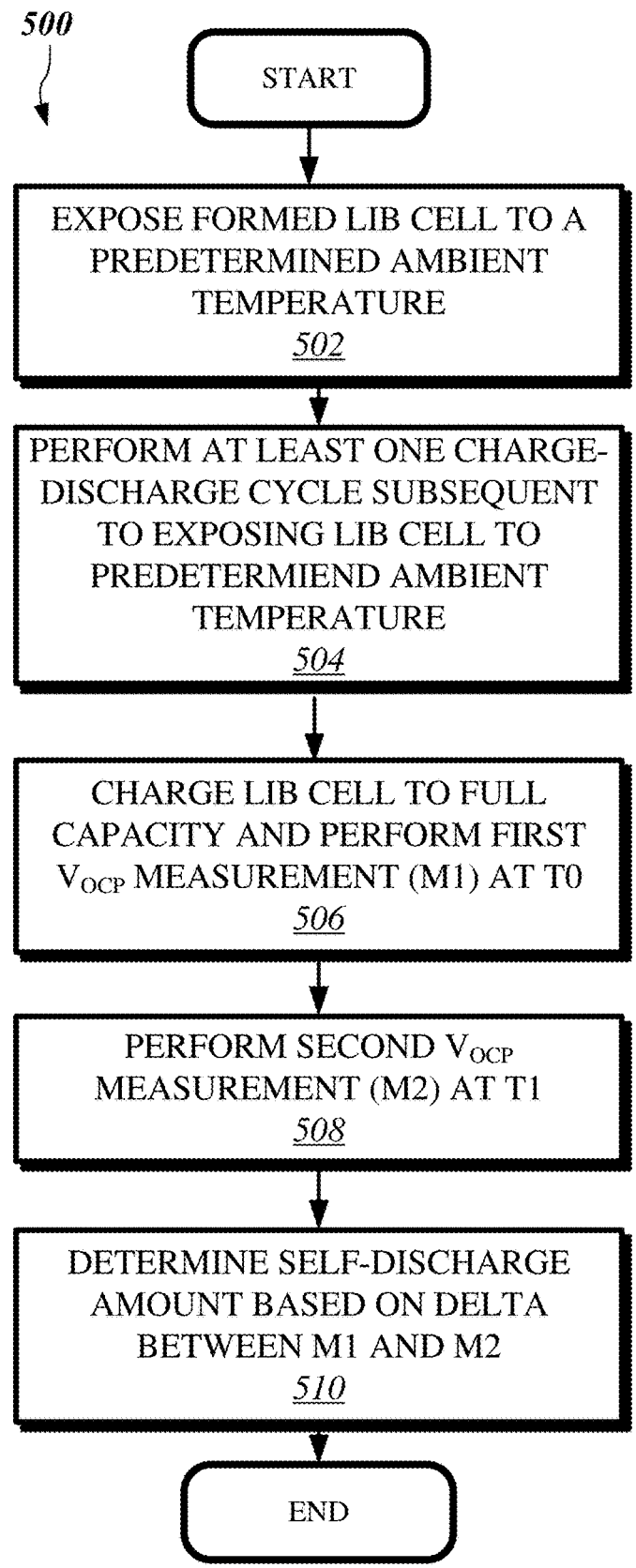
FIG. 5 shows an example process for verifying a LIB cell formed by the example process of FIG. 4 includes a formed SEI layer with a thickness substantially equal to the determined layer thickness value.

FIG. 5 shows a process 500 for verification of a formed SEI layer that exemplifies aspects of the foregoing discussion. The process 500 begins in act 502.

In act 502, the process 500 includes exposing a formed LIB cell (e.g., formed by process 400 of FIG. 4) to a predetermined ambient temperature. Note, the formed LIB cell can include a fully-formed SEI layer, e.g., based on at least one initial charge-discharge cycle being performed, or with an unformed SEI layer. For instance, the formed LIB cell can include an unformed, or a partially-formed SEI layer, wherein SEI layer formation to achieve a target thickness occurs during subsequent charge-discharge cycles (e.g., while in use). Note, the predetermined ambient temperature may be established by, for instance, the target ambient temperature or ambient temperature range received in act 302 of process 300 by the controller 202. Preferably, the predetermined ambient temperature is a temperature with minimal impact on battery state of health and can be derived from pilot experiments, for example. The target ambient temperature is preferably selected to achieve an internal cell formation temperature based on factors such as anode material type. For instance, when utilizing graphitic anodes the preferred ambient temperature is 45±5° C.

In act 504, the process 500 optionally performs at least one charge-discharge cycle subsequent to exposing the LIB cell to the predetermined ambient temperature to orient the LIB cell to the predetermined ambient temperature.

In act 506, the process 500 includes charging the LIB cell to full capacity and performing a first Voce measurement (M1) at T0.

In act 508, the process 500 includes performing a second $V_{OCP}$ measurement (M2) at T1, wherein the time delta, i.e., T1−T0, is a predetermined amount of time during which the battery cell remains without load at the predetermined ambient temperature. Preferably, the time delta is at least four (4) weeks, although other time spans are within the scope of this disclosure. Note, the particular time delta that gets chosen for SEI layer verification may simply be referred to as time T.

In act 510, the process 500 includes determining a self-discharge amount based on a delta between M1 and M2. This can include simply taking the absolute value of M1−M2 and determining a SoC for the LIB cell, and thus, the amount of self-discharge that occurred over the predetermined amount of time based on the associated corrosive current. The process 500 may then output the self-discharge amount.

Notably, the controller 202 may receive the outputted self-discharge amount and compare the same to an expected/target self-discharge amount. The controller 202 may then output a pass/fail indicator via display 208 based on the outputted self-discharge amount from process 500. The controller 202 may also update one or more tables within the SEI database 206 to provide a feedback mechanism to further refine SEI component selection during subsequent LIB formation processes.

In any event, the outputted self-discharge amount from process 500 allows for verification that a formed SEI layer of the LIB cell includes a nominal thickness, e.g., a thickness that is substantially equal to the target layer thickness value, e.g., as determined by act 304 of process 300. For instance, achieving a self-discharge amount for a LIB cell within ±10%, and preferably, ±2% of a target self-discharge amount at the predetermined temperature indicates that the formed SEI layer has a layer thickness that is substantially equal to the target layer thickness, e.g., the layer thickness value determined in act 304 of process 300. Note, the example nominal/predefined tolerances provided above are not intended to be limiting. Importantly, the present disclosure has identified that measuring self-discharge at the predetermined ambient temperature achieves a non-destructive and relatively simple approach to identify and validate formed SEI layer properties for a LIB cell.

Example Battery Temperature Management System (BTMS)

Continued improvement to BTMS systems generally focuses on active-cooling components and techniques. The present disclosure has identified that additional improvement to performance of BTMS includes material selection to increase and homogenize passive thermal communication between battery cells and an associated heatsink. In particular, the present disclosure has identified that disposing boron nitride nanosheets (BNNs) along thermal communication paths of battery cells significantly improves passive heat transfer, which is to say heat transfer that occurs without consuming electrical power. BNNs is reference to crystalline sheet material of boron nitride that is preferably formed by chemical vapor deposition. The boron and nitrogen atoms are typically present in equal numbers in a hexagonal lattice arrangement. The preferred thickness of the BNNs to be placed on a battery heatsink mating surface is in a range of 1-3 mm. The thermal conductivity of Boron Nitride has been experimentally demonstrated to be as high as 420 W/mK which is substantially higher than existing commercially available materials which have a thermal conductivity of about 10 W/mK.

Figure 6:
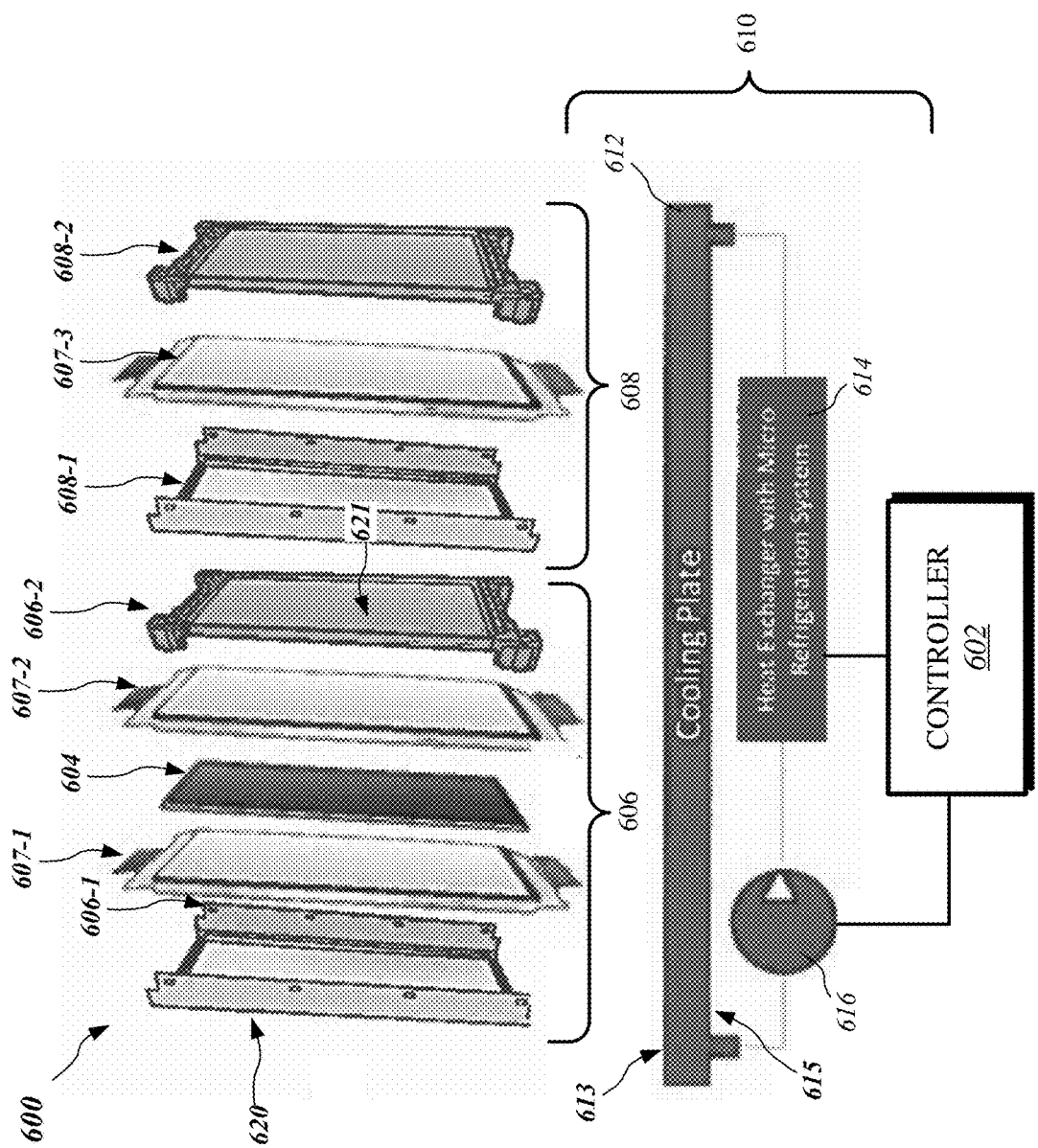
FIG. 6 shows an example battery thermal management system in accordance with embodiments of the present disclosure.

In view of the foregoing, FIG. 6 shows an example battery temperature management system (BTMS) 600 implemented with at least one BNN to increase passive heat transfer. In particular, the BTMS 600 includes first and second battery packages 606, 608, and a temperature control arrangement 610. Note, the particular arrangement and configuration of the first and second battery packages 606, 608, and the temperature control arrangement 610 shown in FIG. 6 is not intended to be limiting. Other configurations and temperature control schemes may be utilized and are within the scope of this disclosure. For instance, N number of battery packages and battery cells may be implemented depending on a desired configuration. In addition, the first and second battery packages 606, 608 may be implemented via LIB technology or other rechargeable battery chemistry that benefits from thermal management.

Continuing on, the first battery package 606 includes a first battery cell housing (also referred to herein as a housing) formed of multiple parts, namely first and second plates 606-1, 606-2. First and second plates 606-1, 606-2 couple together and form a cavity therebetween. As shown, first and second battery cells 607-1, 607-2 are configured to be disposed in the cavity formed between the first and second plates 606-1, 606-2. The first and second battery cells 607-1, 607-2 can be arranged in a stack configuration whereby the first battery cell 607-1 couples to and supports the second battery cell 607-2, or vice-versa. In addition, the embodiment of FIG. 6 includes a boron nitride nanosheet (BBN) 604 disposed and thermally coupled between the first and second battery cells 607-1, 607-2, and is discussed in further detail below.

The first plate 606-1 of the first battery package 606 includes a heatsink mating surface 620 external to the cavity provided by the first and second plates 606-1, 606-2. The heatsink mating surface 620 allows the first plate 606-1 of the first battery package 606 to be thermally coupled to a heatsink, e.g., cooling plate 612. On the other hand, the second plate 606-2 of the first battery package 606 includes a mounting surface 621 external to the cavity formed between the first and second plates 606-1, 606-2 for physically and thermally coupling with the second battery package 608. Thus, the first battery package 606 forms a stack/sandwich structure that thermally couples the first plate 606-1, the first battery cell 607-1, the BNN 604, the second battery cell 607-2, and the second plate 606-2.

As further shown, the second battery package 608 includes a second battery cell housing (also referred to herein as a housing) formed of multiple parts, namely first and second plates 608-1, 608-2. The first and second plates 608-1, 608-2 couple together and form a cavity therebetween. As shown, a third battery cell 607-3 is configured to be disposed in the cavity formed between the first and second plates 608-1, 608-2.

The BNN 604 may be formed via, for instance, exfoliating, surface treating and concentrating BNNs for purposes of deposition via electrophoretic deposition (EPD) to form nanocomposite films and coatings. In an embodiment, BNN 604 comprises graphene, hexagonal boron nitride (hBN), MX2, layered perovskite, or metal chalcogenide structures. Preferably, BNN 604 comprises a hexagonal boron nitride structure which is relatively light weight, durable, and includes high thermal communication properties as well as dielectric behaviors. The layered structure of hexagonal boron nitride enables crystalline sheets to be exfoliated and isolated down to potentially a single atomic thickness. Further processing enables the exfoliated hexagonal boron nitride sheets to be formed into nanocomposites. Accordingly, the BNN 604 is well suited for use within battery cells as the same requires little, if any, increase in battery cell housing footprint.

The first and second battery packages 606, 608 therefore couple together to form a thermal communication path therethrough. The first and second battery packages 606, 608 may then thermally couple to a cold-side 613 of cooling plate 612, with the cooling plate 612 being configured to draw generated heat from the first and second battery packages 606, 608 via the formed thermal communication path. The BNNS 604 disposed along the formed thermal communication path, in in particular at an interface formed between the first and second battery cells 607-1, 607-2, significantly increases passive heat transfer to the cooling plate 612. Thus, the BNNS 604 achieves heat transfer, e.g., up to 420 W/mK, which is an order of 40 times greater than existing commercially available thermal interface materials, e.g., which have a thermal conductivity of about 10 W/mK.

In an embodiment, one or more BNN layers/coatings may be disposed on or within the battery packages 606, 608 to increase passive heat transfer. For example, the heatsink mating surface 620 can include a BNN layer/coating consistent with the present disclosure disposed thereon. Alternatively, or in addition, BNN layer/coatings may be applied to one or more of inner the surfaces of the first/second plates that define the cavities of the first and second battery packages, to the mounting surface 621 that forms an interface between the first and second battery packages 606, 608, and/or to the surfaces defining the first, second and/or third battery cells 607-1 to 607-3.

Continuing on, the temperature control arrangement 610 includes a heatsink in the form of cooling plate 612, a heat exchange controller 602, a heat exchange device 614, and a pump 616. The heat exchange controller 602 outputs an electrical drive signal to the heat exchanger 614. A thermistor (not shown) or other temperature measurement device may be thermally coupled to the first and/or second battery packages 606, 608 (and preferably within the cavity of the first and/or second battery packages) to provide a feedback loop to the heat exchange controller 602. The heat exchange controller 602 can then output the driving signal to the heat exchanger 614 to reject heat above a target temperature based on the feedback loop to control the ambient temperature within the first and second battery packages 606, 608. The heat exchange device 614 can comprise a radiator, for instance, through which water or other liquid gets pumped through by pump 616. Other types of heat exchange approaches are within the scope of this disclosure such as using air-cooling.

The cooling plate 612 includes a cold-side surface 613 for thermally coupling to the first and second battery packages 606, 608. A hot-side surface 615 is disposed opposite the cold-side surface 613. In operation, the temperature control arrangement 610 draws heat from the first and second battery packages 606, 608 away from the hot-side surface 615 along the aforementioned thermal communication path formed between the first and second battery packages 606, 608.

In an embodiment, the first, second and third battery cells 607-1, 607-2, and 607-3 are formed consistent with the present disclosure and include SEI layer thicknesses that enable nominal battery performance when operating at a target ambient temperature or ambient temperature range. For example, each of the first, second and third battery cells 607-1, 607-2, 607-3 can include a formed SEI layer with a thickness that maintains self-discharge at or below a predefined amount, e.g., 6% over four (4) weeks, when operating the target ambient temperature or temperature range. Preferably, the first, second and third battery cells 607-1, 607-2, 607-3 have an SEI layer thickness that enables a self-discharge amount of 3-4% over four (4) weeks.

In this scenario, the BTMS system 600 may be configured to reject heat above, for instance, 60 degrees Celsius. Thus, the BTMS system 600 consumes a relatively small amount of power via an operating current drawn from the first, second and/or third battery cells 607-1, 607-2, 607-3, and preferably, less than 6% of charge over a four (4) week period. The sum of the self-discharge amount and the load by the BTMS system 600 thus equals a virtual self-discharge amount of 10% or less. Therefore, the BTMS system 600 provides a hybrid active-passive thermal management scheme that allows for continuous operation within relatively high ambient temperatures that would otherwise significantly degrade existing LIB cells and/or limit effective energy density (e.g., by necessitating increased load on batteries by the BTMS system 600). To this end, the BTMS system 600 may also be referred to as a LIB BTMS control system 600 or simply a LIB temperature control system.

In accordance with an aspect of the present disclosure a method for forming a lithium ion battery (LIB) cell that limits self-discharge to a target self-discharge amount over a period of time T when operating within a predetermined ambient temperature is disclosed. The method comprising receiving, by a controller, the predetermined ambient temperature for operation of the LIB cell, the predetermined ambient temperature being greater than 35 degrees Celsius, determining, by the controller, a layer thickness value for a formed solid electrolyte interphase (SEI) layer of the LIB cell when executing charge-discharge cycles at the predetermined ambient temperature, the determined layer thickness value of the formed SEI layer to maintain self-discharge of the LIB cell at or below the target self-discharge amount over the period of time T, and forming a LIB cell with an SEI layer based on the determined layer thickness value to maintain self-discharge of the formed LIB cell at or below the target self-discharge amount over the period of time T when operating within the predetermined ambient temperature.

In accordance with another aspect of the present disclosure a lithium ion battery (LIB) temperature control system is disclosed. The LIB temperature control system comprising a first battery package, the first battery package having a housing defined by at least first and second plates that form a cavity therebetween for holding at least one battery cell, the first plate having a heatsink mating surface for thermally coupling to a heatsink, a first lithium ion battery (LIB) cell disposed within the cavity of the first battery package, the first LIB cell having a self-discharge amount of less than 10% over at least a four week period of operation at a target ambient temperature of at least 35 degrees Celsius based at least in part on a layer thickness of a solid electrolyte interphase layer of the first LIB cell and a resulting corrosive current, and a temperature control arrangement comprising a cooling plate with a cold-side thermally coupled to the heatsink mating surface and a hot-side thermally coupled to a heat exchanger, and wherein the temperature control arrangement draws an operating current from at least the first LIB cell to maintain an ambient temperature within the first battery package at or below the target ambient temperature.

In accordance with another aspect of the present disclosure a battery temperature management system (BTMS) is disclosed. The BTMS comprising a first battery package, the first battery package having a housing defined by at least first and second plates that couple together to form a cavity therebetween for holding at least one battery cell, the first plate having a heatsink mating surface external to the cavity for thermally coupling to a heatsink, and a first boron nitride nanosheet (BNN) disposed on the heatsink mating surface to increase passive heat transfer from the first battery package to the heatsink.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. It will be appreciated by a person skilled in the art that a battery and/or battery temperature control arrangement may embody any one or more of the features contained herein and that the features may be used in any particular combination or sub-combination. Modifications and substitutions by one of ordinary skill in the art are considered to be within the scope of the present disclosure, which is not to be limited except by the claims.

What is claimed is:

1. A method for forming a lithium ion battery (LIB) cell that limits self-discharge to a target self-discharge amount over a period of time T when operating within a predetermined ambient temperature, the method comprising:
    receiving, by a controller, the predetermined ambient temperature for operation of the LIB cell, the predetermined ambient temperature being greater than 35 degrees Celsius;
    determining, by the controller, a layer thickness value for a formed solid electrolyte interphase (SEI) layer of the LIB cell when executing charge-discharge cycles at the predetermined ambient temperature, the determined layer thickness value of the formed SEI layer to maintain self-discharge of the LIB cell at or below the target self-discharge amount over the period of time T; and
    forming a LIB cell with an SEI layer based on the determined layer thickness value to maintain self-discharge of the formed LIB cell at or below the target self-discharge amount over the period of time T when operating within the predetermined ambient temperature.

2. The method of claim 1, further comprising:
    determining, by the controller, an open circuit potential of the LIB cell;
    determining, by the controller, an electrical resistance value for the SEI layer of the LIB cell based on at least the predetermined ambient temperature; and
    and wherein identifying the layer thickness value includes selecting a layer thickness value for the SEI layer that results in a corrosion current for the LIB cell that maintains the target self-discharge amount over the period of time T.

3. The method of claim 2, wherein the layer thickness value (L) is determined based on an equation defined as:

$$L = \frac{V_{ocp}}{i_{corr}\rho}$$

where ($V_{ocp}$) is the open circuit potential for the LIB cell, ($i_{corr}$) is a corrosive current, and ($\rho$) is the electrical resistance value for the SEI layer.

4. The method of claim 1, further comprising identifying, by the controller, at least a first SEI precursor and an amount of the first SEI precursor to include within the LIB cell to cause an SEI layer to form with the determined layer thickness value.

5. The method of claim 4, wherein identifying the first SEI precursor and the amount of the first SEI precursor further includes utilizing a molecular dynamics (MD) and/or density functional theory (DFT) simulation.

6. The method of claim 4, wherein determining the first SEI precursor and the amount of the first SEI precursor further comprises selecting one or more SEI precursor materials having a bimolecular rate constant greater than 109 M-1 s-1, and/or selecting a precursor material comprising Hexafluoroarsenate ($AsF_6^-$) and/or Carbon Dioxide ($CO_2$).

7. The method of claim 4, wherein forming the LIB cell further comprises:
    receiving a LIB cell, the LIB cell having an anode metal, a cathode metal, and a electrolyte material disposed therebetween;
    depositing at least the identified first SEI precursor and the amount of the first SEI precursor on to the anode metal of the received LIB cell and/or within the electrolyte material;
    exposing the received LIB cell to the predetermined ambient temperature; and
    performing at least one charge-discharge cycle subsequent to exposing the LIB cell to the ambient temperature by supplying a predetermined voltage to the anode metal of the LIB cell to form an SEI layer.

8. The method of claim 7, further comprising determining a layer thickness of the formed SEI layer is within a predefined tolerance of the determined SEI layer thickness value based at least in part on measuring self-discharge of the received LIB cell over the predetermined period of time T and determining an absolute difference between the measured self-discharge and the target self-discharge amount.

9. The method of claim 7, wherein determining the layer thickness value for the SEI layer of the LIB cell comprises performing a lookup on a table that includes a plurality of ambient temperature values and associated layer thickness values for an SEI layer.

10. The method of claim 1, wherein the predetermined ambient temperature comprises a temperature range for operation of the LIB cell, the temperature range being between 35-65 degrees Celsius, and wherein determining the layer thickness value for the formed SEI layer of the LIB cell further includes calculating a layer thickness value for the formed SEI layer that maintains self-discharge of the LIB cell below the target self-discharge amount over the period of time T, the target self-discharge amount being 10% or less and the period of time T being equal to at least four weeks.

11. A lithium ion battery (LIB) temperature control system, the LIB temperature control system comprising:
    a first battery package, the first battery package having a housing defined by at least first and second plates that form a cavity therebetween for holding at least one battery cell, the first plate having a heatsink mating surface for thermally coupling to a heatsink;
    a first lithium ion battery (LIB) cell disposed within the cavity of the first battery package, the first LIB cell having a self-discharge amount of less than 10% over at least a four week period of operation at a target ambient temperature of at least 35 degrees Celsius based at least in part on a layer thickness of a solid electrolyte interphase layer of the first LIB cell and a resulting corrosive current; and a temperature control arrangement comprising a cooling plate with a cold-side thermally coupled to the heatsink mating surface and a hot-side thermally coupled to a heat exchanger;

and wherein the temperature control arrangement draws an operating current from at least the first LIB cell to maintain an ambient temperature within the first battery package at or below the target ambient temperature.

12. The LIB temperature control system of claim 11, further comprising a second battery package and a second LIB cell disposed in a cavity of the second battery package, wherein each of the first and second LIB cells include a corrosive current that maintains a respective self-discharge amount below 10% when operating at the target ambient temperature.

13. The LIB temperature control system of claim 12, wherein the temperature control arrangement draws the operating current from the first LIB cell and the second LIB cell by drawing first and second currents, respectively, and wherein a sum of the first and second currents and respective corrosive current achieves a virtual self-discharge amount of less than 10% over a four (4) week period for the first and second battery packages.

14. The LIB temperature control system of claim 11, further comprising at least a first boron nanosheet (BNN) disposed on an interface formed between the cold-side of the cooling plate and a second BNN disposed within the cavity of the first battery package and thermally coupling the first LIB cell with the cooling plate, the first and second BNNs to increase passive communication of heat generated by the first LIB cell to the cooling plate of the temperature control arrangement.

15. The LIB temperature control system of claim 11, wherein the target ambient temperature is between 50-65 degrees Celsius.

16. A battery temperature management system (BTMS) comprising:
   a first battery package, the first battery package having a housing defined by at least first and second plates that couple together to form a cavity therebetween for holding at least one battery cell, the first plate having a heatsink mating surface external to the cavity for thermally coupling to a heatsink; and
   a first boron nitride nanosheet (BNN) disposed on the heatsink mating surface to increase passive heat transfer from the first battery package to the heatsink.

17. The BTMS of claim 16, wherein the second plate of the first battery package provides a mounting surface external to the cavity formed between the first and second plates, and wherein the BTMS further comprises:
   a second battery package thermally coupled to the mounting surface of the first battery package; and
   a second BNN disposed between an interface formed between the second battery package and the mounting surface of the first battery package, the second BNNS to increase passive communication of heat from the second battery package to the heatsink by way of a thermal communication path collectively defined by at least the first battery package and the first BNN.

18. The BTMS of claim 16, further comprising:
   a battery cell disposed within the cavity formed between the first and second plates of the first battery package, the battery cell implemented as a rechargeable battery cell; and
   a third BNN disposed within the cavity formed between the first and second plates of the first battery package, the third BNN thermally coupling the first battery cell to the heatsink by way of the first plate of the first battery package and the first BNN disposed on the heatsink mating surface.

19. The BTMS of claim 16, wherein the heatsink comprises a cooling plate, and wherein the BTMS further comprises:
   a heat exchanger thermally coupled to a hot-side of the cooling plate to draw heat therefrom, the heat exchanger electrically coupled to at least the first battery package; and
   a heat exchange controller coupled to the heat exchanger and configured to provide an driving signal to the heat exchanger to maintain a target temperature for the first battery package such that an ambient temperature within the cavity of the first battery package is substantially equal to the target temperature.

20. The BTMS of claim 19, wherein the target temperature is 60±5 degrees Celsius.

21. The BTMS of claim 16, wherein the first BNN comprises a nanocomposite film or coating.

22. The BTMS of claim 16, wherein the first BNN comprises graphene, hexagonal boron nitride (hBN), MX2, layered perovskite, or a metal chalcogenide.

* * * * *